BROAD BAND MAGNETIC TAPE SYSTEM

Filed Oct. 7, 1963 2 Sheets-Sheet 1

Inventor
Ichiro Arimura

By Stevens, Davis, Miller & Mosher
ATTORNEYS

Inventor
Ichiro Arimura
By Stevens, Davis, Miller & Mosher
ATTORNEYS

United States Patent Office 3,392,234

Patented July 9, 1968

3,392,234

BROAD BAND MAGNETIC TAPE SYSTEM

Ichiro Arimura, Kyoto, Japan, assignor to Matsushita Electric Industrial Co., Ltd., Osaka, Japan, a corporation of Japan Filed Oct. 7, 1963, Ser. No. 314,111
Claims priority, application Japan, Oct. 8, 1962, 37/44,574
1 Claim. (Cl. 178—6.6)

ABSTRACT OF THE DISCLOSURE

The present application is directed to a device for recording and reproducing a broad band signal comprising a magnetic tape and a plurality of rotary heads including magnetic transducers, wherein said magnetic tape is caused to travel through the angle of 360° divided by the number of said magnetic transducers, on the rotary track of said tranducers and at the moment when one of the magnetic transducers has finished to sweep the tape on a slant and is being detached from the tape the subsequent transducer is adapted to begin the next sweep, whereby a continuous signal is recorded as a plurality of record tracks and reproduced by the tracks without employing switching circuits. The output channels coupled to the read heads are at all times in the ON condition but by virtue of the sweep arrangement, no signal overlap is produced.

The present invention relates to a method of recording and reproducing signals in a magnetic recording and reproducing system. More particularly, the invention relates to a device for recording and reproducing a broad-band signal, comprising a magnetic tape and a plurality of rotary heads including magnetic transducers, wherein said magnetic transducers are adapted to sweep diagonally across said magnetic tape and means are provided for recording the broad-band signal without any overlapping and for mixing reproduced signals obtained by reproducing said broad-band signal to thereby obtain a continuously reproduced output signal.

According to conventional methods of directly recording signals of an extremely high frequency or signals ranging over an extremely wide frequency band, such as television signals, on a magnetic tape used for the magnetic recording, it has generally been necessary that a magnetic medium moves past a magnetic gap of a recording or reproducing head at an exceedingly high velocity relative to the latter in order to make possible the reproduction of high frequency components of recorded signals. On the other hand, the magnetic medium such as a magnetic tape is required to run at an ordinary slow velocity. In order to satisfy both of these two contradictory requirements, a method has been proposed in which the magnetic head is made to be mechanically rotated at a high velocity in the transverse direction of said tape to attain the desired relative velocity between the tape and the recording head. The tape is made to pass said head at a rate of 15 inches per second in the longitudinal direction of said tape and signals are thereby recorded in the form of a series of traversing lines or tracks. In order to obtain completely continuous reproduced signals in a recording and reproducing device for broad-band signals having such rotary magnetic heads, both ends of a sweeping period assigned to one magnetic head during the recording operation are extended so that the recording can be carried out in a manner that said ends are simultaneously superimposed on one end of a sweeping period of the other magnetic head which sweeps directly following the former. Due to such manner of recording, the reproduced signals obtained by the respective magnetic heads include the overlapped portions. Means are therefore necessary to remove the overlapped portions from these reproduced signals by the use of a suitable switching circuit to thereby obtain continuously reproduced output signals.

With the above defects of prior technique in view, the primary object of the invention is to provide an improved recording and reproducing method in a device adapted for recording and reproducing broad-band signals comprising a magnetic tape and a plurality of rotary heads including magnetic transducers.

Another object of the invention is to provide a device of said nature comprising means for enabling the rotary magnetic transducers to sweep diagonally across the magnetic tape, means for recording a broad-band signal on the magnetic tape without overlapping, and means for mixing reproduced signals obtained by the reproduction of said broad-band signal to thereby obtain a continuously reproduced output signal.

Still another object of the invention is to provide a device of said nature comprising said broad-band signal in the form of a television signal and means for recording and reproducing television images.

Further another object of the invention is to provide a device of said nature in which, during the recording of said television signal, ends of diagonal sweep of the magnetic tape by the magnetic transducers are made to coincide with a portion including a vertical blanking period of the television signal.

Another object of the invention is to provide a device of said nature in which any subsequent sweep is started as soon as one of the magnetic transducers is disengaged from said magnetic tape at the end of a diagonal sweep.

Still another object of the invention is to provide a device of said nature comprising means for providing an electromagnetic shield at an area in which said magnetic transducers do not sweep the magnetic tape.

There are other objects and particularities of the invention which will become obvious from the following description with reference to a preferred embodiment of the invention illustrated in the accompanying drawings, in which.

The device of the invention, shown in FIGS. 1–8, provides an easily maintainable and simple means of recording and reproducing a broad-band signal, in which the broad-band signal is recorded on a magnetic tape without being overlapped and reproduced signals obtained by the reproduction of said broad-band signal are mixed to provide a continuously reproduced output signal, as mentioned in the foregoing. However, before proceeding any further with the explanation of the device of the invention, more detailed explanation of devices of conventional structure will assist in the better understanding of the device of the invention.

With regard to aforementioned conventional methods, several examples may be considered. But, explanation will be made with reference to a magnetic recording and reproducing device having a rotary head drum of two head system, since it is most deeply related to the device of the invention. The cited conventional device is based on a slanting scanning of a tape by the heads and is described in details on pages 868–871 of "Journal of the S.M.P.T.E." of the December 1960 issue. Hereinunder, rough information will be given with reference to a recording and reproducing method disclosed in the publication.

Figure 9:
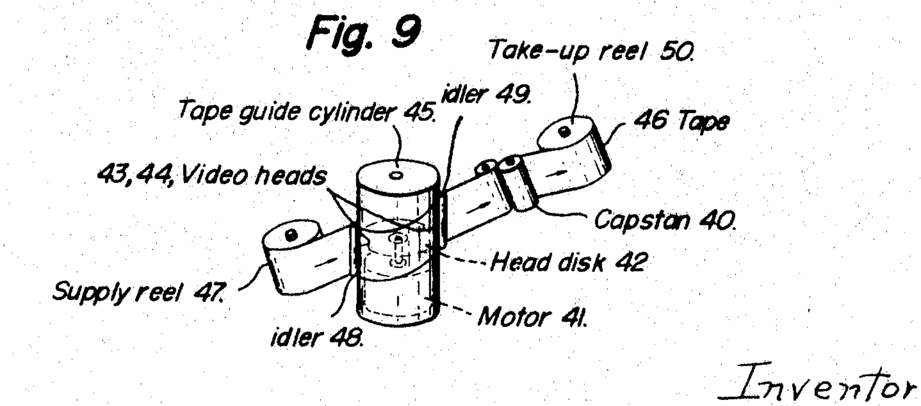
FIG. 9 is an explanatory view of a magnetic recording and reproducing device of conventional type.

The cited device is provided with an arrangement as shown in FIG. 9 and will be explained with reference to the drawing. In FIG. 9, a synchronous motor 41 is provided to drive a head disc 42 containing therein two video heads 43 and 44. The motor 41 acts to rotate the head disc 42 at 1800 r.p.m. All of these mechanisms are accommodated within a tape guide cylinder 45 and the video heads 43 and 44 are made to rotate with tip portions thereof protruding on the surface of the guide cylinder 45. A magnetic tape 46 is drawn out of a supply reel 47 and led past a first idler 48 to abut the tape guide cylinder 45 along about the half of its circumference. Then, the magnetic tape 46 is taken up on a take-up reel 50 through a second idler 49 and a capstan drive mechanism 40. When the tape 46 moves along the half of the circumference of the tape guide cylinder 45, the two video heads 43 and 44 disposed on the circumference of the rotary head disc 42 in diametrically symmetrical relation make a rectilinear sweep on the tape 46 to thereby attain the recording of a television signal.

It is apparent that magnetized tracks thus formed by the rectilinear sweep on the magnetic tape take the form of two magnetized tracks having alternate positions relative to each other. In order for such tracks to record a continuous signal, the magnetic heads must be quickly switched from one to the other at a starting end of one track adjacent a terminating end of the other track. Such manner of operation inevitably results in that there is a zone in which both of the two magnetic heads make simultaneous recording at the terminating and starting ends of the two tracks disposed adjacent to each other. Therefore, an arrangement is made to obtain only the signal of either of the two magnetic heads in the overlapped zone by means of an electronic switching circuit so that these two signals may not be combined due to the overlapping during the reproducing operation. Such switching action is effective to provide a reproduced signal of accurately continuous nature and to eliminate any noise which may be picked up by the magnetic heads during a period in which the magnetic heads do not make the sweeping action on the tape. However, it will be understood that such electronic switching means requires a high degree of precision, and said method of superimposed recording of both extremities of the tracks is defective in its low degree of utilization of the magnetic tape.

Description will now be made with regard to the contents of the invention which provides a magnetic recording and reproducing device for broad-band signals, wherein the prior defects of the conventional methods are eliminated, and facility of maintenance as well as simple means of recording and reproducing signals is incorporated.

Figure 1:
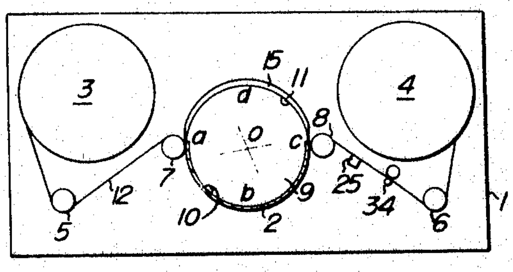
FIG. 1 is a schematic plan view showing one form of the arrangement of a magnetic recording and reproducing device according to the invention.

Referring now to FIG. 1, there is shown a tape drive mechanism of the device of the invention, wherein a novel arrangement is made so that rotary magnetic heads may not effect recording on a magnetic tape in the overlapped manner. A base plate 1 is provided which is commonly called a tape transport panel. A tape guide 2 is a substantially cylindrical shape and formed with a gap for permitting protrusion therethrough of tip portions of two magnetic heads 10 and 11 provided on the periphery of a rotary head drum 9. The axis of the tape guide 2 is slightly inclined with respect to a line perpendicular to the base plate 1. Therefore, it will be known that the axis of the rotary head drum 9 accommodated in the tape guide 2 in coaxial relation thereto and the axis of an electric motor for driving said rotary head drum 9 are also inclined by the same degree with respect to the line perpendicular to the base plate 1. A magnetic tape 12 is drawn out of a supply reel 3 and led past a first idler 5 and a second idler 7 to one end of the tape guide 2. The first idler 5 has an axis perpendicular to the base plate 1, while the second idler 7 has an axis parallel to the axis of the tape guide 2 and its position is adjustable on the base plate 1 so that the tape 12 can be satisfactorily guided thereby to abut the tape guide 2. After recording or reproducing has been made by the magnetic heads 10 and 11 disposed in the rotary head drum 9, the magnetic tape 12 is guided outwardly from the other end of said guide 2 and taken up on a take-up reel 4 through another second idler 8, a control head 25, a capstan mechanism 34 and another first idler 6. On the rear portion of the tape guide 2, or a range of a semicircular arc *adc* thereof at which the tape guide 2 does not abut the tape 12, there is provided an electromagnetic shield 15 of suitable shielding material such as copper or iron. It will readily be known that the shield plate 15 is effective to prevent the magnetic heads 10 and 11 from picking up an unnecessary noise during a period when these heads do not sweep the tape 12.

Figure 2:
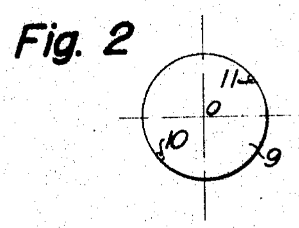
FIG. 2 is a plan view of a rotary head drum of the device of the invention.

FIG. 2 shows a schematic plan view of the rotary head drum 9 incorporated in the device of FIG. 1. As shown in FIG. 2, the rotary head drum 9 has a center O, and the two magnetic heads 10 and 11 are disposed on its diametral line thereof. The rotary head drum 9 is a rotary body which is driven by a synchronous motor.

Figure 3:
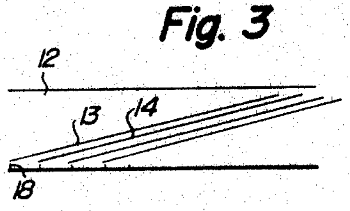
FIG. 3 is a view showing tracks recorded on a magnetic tape by the broad-band signal recording and reproducing device of the invention.

As described in the foregoing, the rotary body 9 has slight inclination with respect to the advancing tape. It will therefore be apparent that, when the magnetic tape 12 is made to be advanced along the circumference of such rotary body 9 in abutting relation thereto, magnetized tracks formed on the magnetic tape 12 by the magnetic heads 10 and 11 take the form of two magnetized tracks 13 and 14 alternately disposed one after another, as shown in FIG. 3. In order to record a continuous signal on such magnetized tracks, the magnetic heads 10 and 11 must be quickly switched from one to the other at a terminating end of the magnetized track 13 and a starting end of the magnetized track 14. This is easily attainable by suitably adjusting the positions of the second idlers 7 and 8 so that each of the magnetized tracks 13 and 14 by the respective magnetic heads 10 and 11 may not be formed beyond a semicircumference ABC to thereby cause overlap of the tracks. Thus, one of the magnetic heads will start to abut the magnetic tape when the other leaves the tape. In other words, by suitable manipulation of the second idlers 7 and 8, the range of abutment between the tape and the heads can be limited to a range of semicircumference through which the magnetic heads successively rotate.

Figure 4:
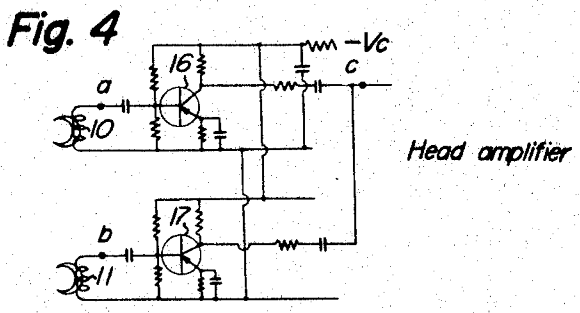
FIG. 4 is a connection diagram of an embodiment of a mixing circuit adapted for the device according to the invention.

FIG. 4 shows an electrical connection diagram of head amplifiers which amplify and mix the output of the magnetic heads 10 and 11 to provide a series of continuous signals. The head amplifiers comprise two transistors 16 and 17 of PNP-type having their emitters grounded. The circuit has an amplification degree of about one to five times and is arranged to provide a continuous output signal mixed on the collector side. Normally, both of the transistors 16 and 17 are placed in operation, and an output picked up from the magnetic tape 12 by the magnetic heads 10 and 11 during their successive rotation through the semicircumference is merely alternately supplied to the collector side. Thus it is possible to provide the continuous signal.

Figure 5:
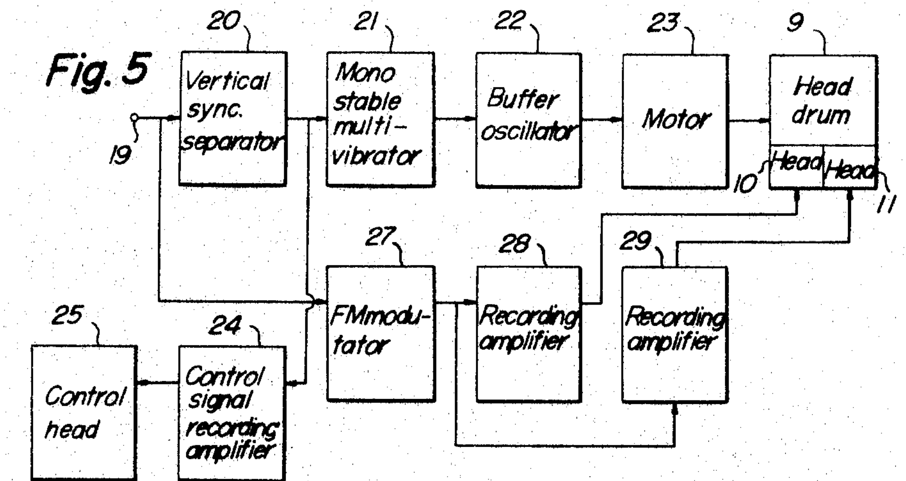
FIG. 5 is a block diagram of the television signal recording and reproducing device of two head system of the invention, during the recording operation.
Figures 6, 7, 8:
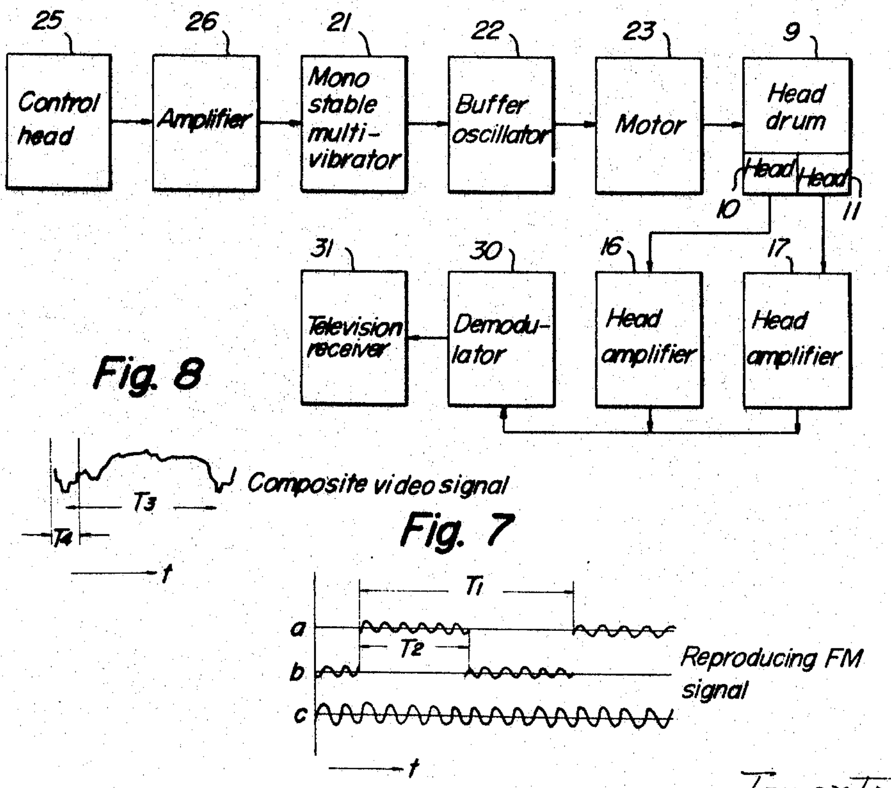
FIG. 6 is a block diagram of the device of FIG. 5 during the reproducing operation.
FIG. 7 is a view showing wave forms of a signal at various portions of the circuit of FIG. 4.
FIG. 8 is a view showing a wave form of a television signal applied to the device of FIG. 5.

FIGS. 5 and 6 show block diagrams of the device according to the invention during recording and reproducing, respectively, when it is applied to recording and reproducing a television signal.

A composite video signal led out of a television receiver or a television camera is introduced through an input terminal 19 into a vertical synchronizing signal separator 20 to obtain the vertical synchronizing signal alone, which is used to trigger a mono-stable multivibrator 21. The output of the multivibrator 21 acts to lock a buffer oscillator 22 which has an output frequency of 60 cycles, the same frequency with that of the vertical synchronizing signal. The output of the buffer oscillator 22 drives a drum driving motor 23.

Hereinunder, brief explanation will be given with reference to the driving motor 23, taking the case of a brushless D.C. motor by way of an example. A control winding and a driving winding of the stator of the motor are constituted by a base coil and a collector coil of a transistor oscillation circuit, while the rotor is constituted from a permanent magnet. The rotor is continuously rotated by an electromagnetic force between the permanent magnet rotor and a rotating magnetic field developed in the stator winding by the oscillating action in the transistor circuit. In the motor, for example, synchronism with an external signal is effected by a transformer interposed in series in the base coil. Rotation of 1800 r.p.m. will be obtained when the brushless D.C. motor of four poles is used, and the motor rotates in strict synchronism with said vertical synchronizing signal. Therefore, the duration of abutment of the magnetic heads 10 and 11 with the magnetic tape is exactly $\frac{1}{60}$ second which corresponds to one field of the television information.

The composite video signal is modulated by a suitable modulator such as an FM modulator 27 and introduced into the magnetic heads 10 and 11 through recording amplifiers 28 and 29. On the other hand, the vertical synchronizing signal is written on the magnetic tape 12 by means of a control signal recording amplifier 24 through the control head 25 secured on the base plate 1. As described in the foregoing, FIG. 3 shows the magnetized tracks recorded on the magnetic tape by the above recording process, wherein the slanting tracks 13 and 14 are formed by the magnetic heads 10 and 11, and tracks 18 at the lower edge of the tape 12 are formed by the control signal head 25.

In case of the reproducing operation, the control signal on the magnetic tape 12 triggers the mono-stable multivibrator 21 through the control head 25 and an amplifier 26. The output of the multivibrator 21 triggers the buffer oscillator 22 as in the case of the recording, and the output of the buffer oscillator 22 in turn rotates the drum driving motor 23 in synchronous relation to the signal. Since the capstan motor rotates at a constant speed throughout the recording and reproducing processes, the head drum is also rotated at a constant speed throughout the recording and reproducing operations, and the rotation is held in a manner that there is provided a predetermined relation between the phases of the vertical synchronizing signal or the control signal and the rotary magnetic heads 10 and 11. Therefore, in the case of the reproducing operation, the respective magnetic heads 10 and 11 can retrace the tracks 13 and 14 having been drawn thereby during the recording operation, and thus the purpose of reproducing can be attained. The output of the magnetic heads 10 and 11 are led through the head amplifiers 16 and 17 into a demodulator 30 for demodulation into the video signal, which is introduced into a television receiver 31. It will therefore be understood that the magnetic heads 10 and 11 alternately abut the tape 12 through each semicircumference of the head drrum 9 to write the information for recording, while, during the reproducing operation, the magnetic heads likewise alternately abut the tape to pick up all of the information having been written on the tape during the recording operation.

Preferably, the magnetic heads may be switched over between each other at a portion of the signal which may not appear as a picture on the television receiver, that is, at a portion including the vertical blanking. Or more precisely, in FIG. 8, the period $T_3$ of the vertical synchronizing signal corresponds to one field and is equal to the time required for tracing one of the tracks 13 and 14 drawn by the magnetic heads 10 and 11 on the magnetic tape. Further, since the magnetic heads are rotated in strict synchronism with the vertical synchronizing signal as described in the above, said requirement can be satisfied by varying the delay time of the monostable multivibrator 21 and thus varying the phase of rotation of the magnetic heads in a manner that the position of switchover of the magnetic heads may be disposed in a portion including the vertical blanking $T_4$.

In the explanation given hereinbefore, the basic principle of the inventive concept of the magnetic recording and reproducing device of the invention has been disclosed. In order to provide a more clear understanding about the contents of the invention, the preferred embodiment of the device of the invention will now be explained hereinunder on a more materialized basis.

In FIG. 1, the rotary head drum 9 has a diameter of 220 mm., and the magnetic heads 10 and 11 fitted to the rotary drum 9 are composed of such material as Aluperm or ferrite and have an impedance of about 1 kilohm at a frequency of 3 megacycles. When, as described in the foregoing, the four-pole brushless D.C. motor is selected as the synchronous motor for driving the rotary head drum 9, the motor rotating at 1,800 r.p.m. may be used to operate at supply D.C. voltage of about 30 volts and synchronous input signal frequency of 60 cycles.

The magnetic tape 12 is a video tape of 1 inch in width comprising an iron oxide coating provided on a thin base. The magnetic tape 12 is made to run at a rate of 38 cm./sec. along the semicircular arc *abc* of the rotary head drum 9. From the above relation, a relative velocity of 20 m./sec. is obtained between the magnetic heads and the magnetic tape. The rotary head drum 9 is disposed to have an inclination in the order of 3° with respect to the advancing tape. Therefore, the tracks drawn by the magnetic heads 10 and 11 will be as shown at 13 and 14 in FIG. 3. In order to limit the abutting range of the magnetic heads 10 and 11 with the magnetic tape 12 to the semicircular arc *abc* as described above, the positions of the idlers 7 and 8 are adjustable within a range of 10 mm. in either directions tangentially of the circumference of the rotary head drum 9 so as to permit suitable adjustment of the abutting range between the magnetic tape and the magnetic heads.

At the relative velocity of about 20 m./sec. between the magnetic heads and the magnetic tape, a head gap of 2 $\mu$m. of the magnetic heads composed of such material as Aluperm or ferrite, and at a recording track width of 300 $\mu$m., a peak to peak output in the order of 1 millivolt can be obtained between the terminals of the magnetic heads, and the frequency that can be recorded and reproduced is in the order of 3.5 megacycles.

In the television signal recording and reproducing device shown in the block diagrams of FIGS. 5 and 6, the frequency modulator operates at a carrier frequency in the order of 3 megacycles and at a frequency modulation index of about 0.2. Then, the modulated frequency band may include a high frequency of more than 4 megacycles and the reproducing output of the magnetic heads will become less at such frequency. Therefore, low-noise type amplifiers must be used in the mixing circuit shown in FIG. 4. As explained in the foregoing, this circuit is always placed in the operating condition. In case, therefore, the transistors 16 and 17 have a considerably great amplification degree, noises generated in the transistors and noises picked up by the magnetic heads 10 and 11 during the period of disengagement from the magnetic tape 12 may be amplified to an extent that an undesirable signal to noise ratio may be obtained in the reproduced signal. Accordingly, the transistors 16 and 17 may preferably be operated at a low amplification degree of one to three times, and grounded on their emitter side as described above. The transistors are adapted to amplify the output of the magnetic heads without performing any electronic switchover action and mixing is effected at the collector side.

FIG. 7 shows how the signals from the respective magnetic heads 10 and 11 are amplified by the transistors 16 and 17 to provide a continuous signal. Symbols *a, b* and *c* in FIG. 7 correspond to points *a, b* and *c* in the circuit of FIG. 4. $T_1$ in FIG. 7 shows a time in which the magnetic heads make one rotation, that is, $\frac{1}{30}$ second. $T_2$ corresponds to the half of $T_1$, or $\frac{1}{60}$ second, and shows a time in which one of the magnetic heads abuts the magnetic tape and picks up the signal recorded on the tape. This time $T_2$ is also equal to a time wherein the other magnetic head is disengaged from the tape and no reproduced signal is generated thereby. The reproduced signals *a* and *b* of the respective magnetic heads are mixed to form an output signal *c* which is continuous. The reproduced signal thus obtained is a high frequency modulation signal which is subsequently demodulated by the demodulator 30. The television signal after the above demodulation will have a signal to noise ratio in the order of 40 decibels under the above condition. Although this value taken in an actual measurement is 1 to 2 decibels lower than a value obtained with a device having a conventional electronic switchover circuit, this slight difference will not bring forth any difficulty in practical operation. It will therefore be understood that the device according to the invention is featured by its extremely simpler structure than conventional devices having an electronic switchover circuit.

Although, in the foregoing description, the invention has been explained with reference to the specific embodiment, it will be understood that the invention is in no way limited to such embodiment, and various modifications and changes may be made without departing from the spirit of the invention.

What is claimed is:

1. A switchless device for recording and reproducing a television signal comprising a magnetic tape, a plurality of rotary heads including equally spaced magnetic transducers arranged so as to sweep said magnetic tape sequentially and continuously in a slant relative to the long dimension of the tape, a tape guide housing said rotary heads, two idlers provided in the vicinity of said tape guide housing and being adapted to cause said tape to travel through the angle of 360° divided by the number of said transducers on the rotary track of said transducers along said tape guide and, at the moment when one of said magnetic transducers has finished its slant sweep and is being detached from the tape, to cause the subsequent magnetic transducer to begin the next sweep, at least one of said idlers being adapted to enable its position to be adjusted, said transducers being adapted to sweep said tape continuously in crossing slantly, the end portions of the slant sweep on the tape by said magnetic transducers being made uniform in the vicinity of the vertical synchronous signal out of said television signal, means for rotating said magnetic heads in having them synchronized with the vertical synchronous signal out of said television signal at the time of recording, means for recording on the end portion of said magnetic tape with the signal at a definite phase relation with said vertical synchronous signal as a controlling signal at the time of recording, said television signal to be recorded at the time of recording being applied to all of said magnetic transducers, means for successively sweeping the record tracks of the television signal recorded on said tape by said magnetic transducers at the time of reproducing, said recorded controlling signal being reproduced and said rotary heads being rotatingly driven in synchronism with said reproduced controlling signal at the time of reproducing, and means for connecting said transducers in parallel at all times and adding the outputs of all of said transducers thereby a continuous reproduced output being obtained.

References Cited

UNITED STATES PATENTS

| | | | |
|---|---|---|---|
| 3,197,559 | 7/1965 | Kihara | 179—100.2 |
| 2,832,840 | 4/1958 | Morin | 179—100.2 |
| 2,956,114 | 10/1960 | Ginsburg et al. | 178—6.6 |
| 2,968,692 | 1/1961 | Ginsburg et al. | 179—100.2 X |
| 3,117,188 | 1/1964 | Anderson et al. | 179—100.2 |
| 3,152,226 | 10/1964 | Stratton | 179—100.2 |

BERNARD KONICK, *Primary Examiner.*

J. R. GOUDEAU, L. G. KURLAND, *Assistant Examiners.*